(12) United States Patent
Jameson et al.

(10) Patent No.: US 9,914,134 B2
(45) Date of Patent: Mar. 13, 2018

(54) SYSTEMS AND METHODS FOR CLEANING AIR

(71) Applicant: Trane International Inc., Piscataway, NJ (US)

(72) Inventors: Richard L. Jameson, Tyler, TX (US); Mark D. Woodruff, Tyler, TX (US); Jay E. Field, Troup, TX (US)

(73) Assignee: Trane International Inc., Piscataway, NJ (US)

( * ) Notice: Subject to any disclaimer, the term of this patent is extended or adjusted under 35 U.S.C. 154(b) by 103 days.

(21) Appl. No.: 14/811,240

(22) Filed: Jul. 28, 2015

(65) Prior Publication Data

US 2016/0030949 A1    Feb. 4, 2016

Related U.S. Application Data

(60) Provisional application No. 62/031,690, filed on Jul. 31, 2014.

(51) Int. Cl.

| | |
|---|---|
| *B03C 3/47* | (2006.01) |
| *B29C 31/10* | (2006.01) |
| *B03C 3/09* | (2006.01) |
| *B03C 3/12* | (2006.01) |
| *B03C 3/155* | (2006.01) |
| *B03C 3/32* | (2006.01) |
| *B03C 3/36* | (2006.01) |
| *B03C 3/41* | (2006.01) |

(Continued)

(52) U.S. Cl.
CPC .................. *B03C 3/47* (2013.01); *B03C 3/09* (2013.01); *B03C 3/12* (2013.01); *B03C 3/155* (2013.01); *B03C 3/32* (2013.01); *B03C 3/368* (2013.01); *B03C 3/41* (2013.01); *B03C 3/86* (2013.01); *F24F 3/166* (2013.01)

(58) Field of Classification Search
CPC combination set(s) only.
See application file for complete search history.

(56) References Cited

U.S. PATENT DOCUMENTS

| | | |
|---|---|---|
| 2,252,694 A | 8/1941 | Bennett |
| 2,864,460 A | 12/1958 | Powers |

(Continued)

FOREIGN PATENT DOCUMENTS

GB            891930 A        3/1962

*Primary Examiner* — Sonji Turner
(74) *Attorney, Agent, or Firm* — Conley Rose, P.C.; J. Robert Brown, Jr.

(57) ABSTRACT

An air cleaning system has a field charger comprising a plurality of bars comprising a conductive inner core and a non-conductive overmold, and a plurality of pins attached to the bars and extending out of the non-conductive overmold. The conductive inner core is molded over the plurality of pins, conductively connecting the pins, and the non-conductive overmold is molded over the conductive inner core. A method of manufacturing the field charger includes placing a plurality of metal pins in a mold, placing contact points in the mold, molding a conductive resin over at least a portion of the plurality of pins and contact points, molding an insulating resin over the inner core, plurality of pins, and contact points, wherein at least a portion of the pins and contact points extend from the non-conductive overmold, and mounting an earthplate to the conductive overmold.

9 Claims, 8 Drawing Sheets

(51) Int. Cl.
*B03C 3/86* (2006.01)
*F24F 3/16* (2006.01)

(56) References Cited

U.S. PATENT DOCUMENTS

| | | | | |
|---|---|---|---|---|
| 3,735,560 | A * | 5/1973 | Wellman | B03C 3/38 55/481 |
| 3,957,462 | A * | 5/1976 | Schminke | B03C 3/41 427/185 |
| 7,909,918 | B2 * | 3/2011 | Bias | B03C 3/12 96/26 |
| 2006/0016335 | A1 * | 1/2006 | Cox | B03C 3/09 96/15 |
| 2007/0039462 | A1 * | 2/2007 | Helt | B03C 3/12 95/6 |
| 2007/0039472 | A1 * | 2/2007 | Bias | B03C 3/025 96/66 |
| 2010/0058929 | A1 * | 3/2010 | Yanagida | B03C 3/41 96/97 |

* cited by examiner

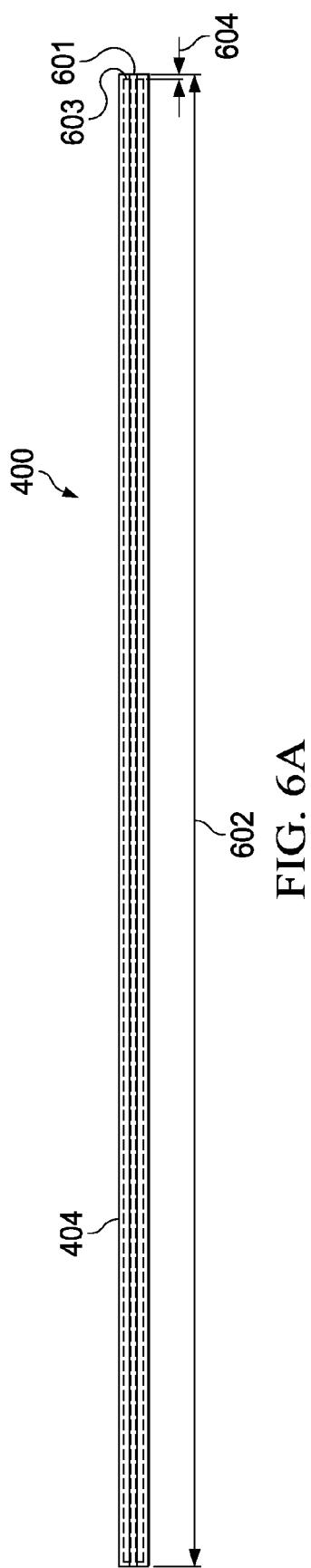
FIG. 6A
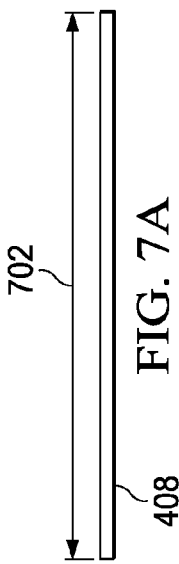
FIG. 6B
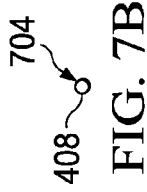
FIG. 7A
FIG. 7B

SYSTEMS AND METHODS FOR CLEANING AIR

CROSS-REFERENCE TO RELATED APPLICATIONS

The present application claims priority under 35 U.S.C. 119(e) to U.S. Provisional Patent Application No. 62/031,690 filed on Jul. 31, 2014 by Jameson, et al. and entitled "Systems and Methods for Cleaning Air," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Indoor air pollution may lessen enjoyment of an indoor space as well as present a health hazard. Indoor air pollution may comprise airborne pollutants such as dust, smoke, pollen, animal dander, mold, and mildew which may be present in indoor spaces in quantities sufficient to present a health hazard to occupants of the indoor space. Some heating, ventilation, and air conditioning (HVAC) systems comprise an air cleaner to filter pollutants from air circulated through the HVAC systems.

SUMMARY

In some embodiments of the disclosure, an air cleaning system is provided that comprises a field charger, wherein the field charger comprises: a plurality of bars comprising a conductive inner core and a non-conductive overmold, and a plurality of pins attached to the bars and extending out of the non-conductive overmold; at least one collection cell; and a cabinet operable to house the field charger and at least one collection cell. The conductive inner core may be molded over the plurality of pins, conductively connecting the pins, and the non-conductive overmold may be molded over the conductive inner core.

In yet other embodiments of the disclosure, a field charger for use with a clean air system is disclosed. The field charger comprises a plurality of metal pins; a conductive resin molded over a portion of the metal pins, wherein the molded conductive resin forms a grid shape, and wherein the conductive resin conductively connects the plurality of metal pins; an insulating resin molded over the conductive resin and a portion of the metal pins; contact points molded into the conductive resin and insulting resin, wherein any voltage applied to the contact points is therefore applied to the conductive resin and the metal pins; and an earthplate coupled to the grid shape operable to provide a ground connection.

In other embodiments of the disclosure, a method of manufacturing a field charger for use in a clean air system is disclosed. The method comprises placing a plurality of metal pins in a mold; placing contact points in the mold; molding a conductive resin over at least a portion of each of the plurality of pins and contact points, wherein the conductive resin forms an inner core; molding an insulating resin over the inner core, plurality of pins, and contact points, wherein the insulating resin forms a non-conductive overmold, and wherein at least a portion of the pins and contact points extend from the non-conductive overmold; and mounting an earthplate to the conductive overmold.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 6A is an orthogonal side view of an insulating overmold of a bar of a field charger according to an embodiment of the disclosure;

FIG. 6B is an orthogonal end view of the insulating overmold of FIG. 6A according to an embodiment of the disclosure;

FIG. 7A is an orthogonal side view of a pin which may be molded into an inner core of a field charger according to an embodiment of the disclosure;

FIG. 7B is an orthogonal end view of the pin of FIG. 7A according to an embodiment of the disclosure.

DETAILED DESCRIPTION

Air cleaners used in HVAC systems, and possibly other applications, may comprise a field charger and collection cells operable to charge and collect particles in the air that flows through the air cleaner. Field chargers may comprise pins that create a current in the air around the pins that ionizes particles in the air. The collection cells are oppositely charged relative to field charger and may attract and collect the charged particles. In some field chargers comprising pins that are conductively connected by welding to metal bars, the metal bars are housed in a non-conductive covering or case. In wet conditions, carbon deposits may form in the field charger, causing electrical tracking that reduces the effectiveness of the field charger. The current disclosure provides an improved design for a field charger that may reduce the risk of carbon deposits forming in the field charger. Additionally, the embodiments of the current disclosure may provide a more homogeneously conductive bar core that more evenly distributes power through the bar core so that an efficiency of each pin connected to the conductive bar core is more uniform. The disclosure further provides methods for manufacturing the improved field charger using injection molding.

Figure 1:
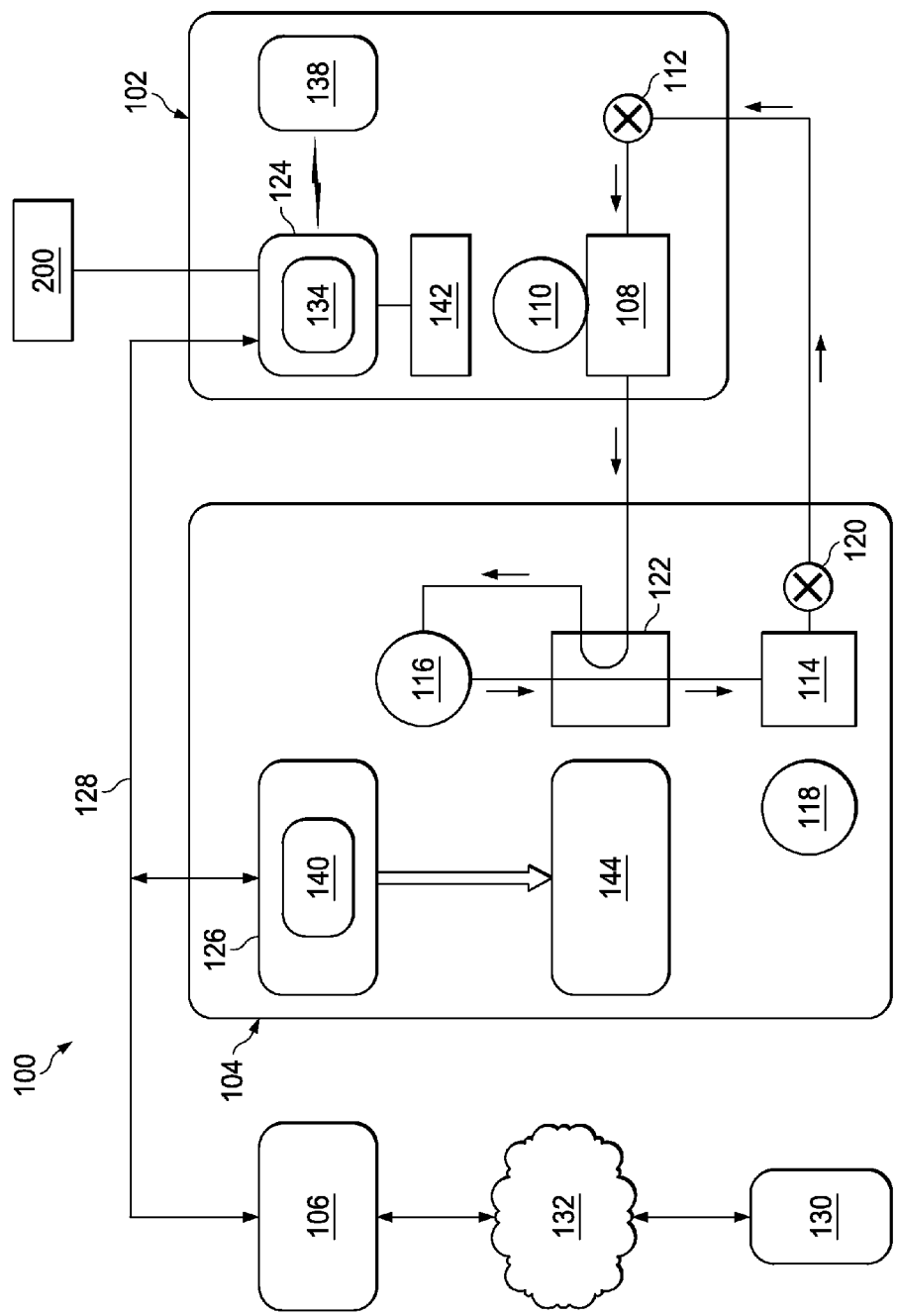
FIG. 1 is a schematic diagram of an HVAC system according to an embodiment of the disclosure.

Referring now to FIG. 1, a schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor drive electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, and a reversing valve 122. Outdoor heat exchanger 114 is a microchannel heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a spine fin heat exchanger, a plate fin heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

While HVAC system 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

It will be appreciated that a so-called clean air delivery rate (CADR) of HVAC system 100 may be defined as the product of a volumetric flow-rate (sometimes expressed in units of cubic feet per minute or CFM) of air passing through air cleaner 200 multiplied by a so-called air cleaner efficiency of air cleaner 200. Accordingly, a relatively higher CADR may generally be accomplished by adjusting the volumetric flow-rate of air through the air cleaner 200 and/or by adjusting the air cleaner efficiency so that the product of the two is relatively increased. In this embodiment, air cleaner 200 may operate to clean air using a so-called electrostatic precipitation process. In some embodiments, the air cleaner 200 may comprise an electrically powered field charger configured to enable the electrostatic precipitation process. In some embodiments, varying an electrical supply to the field charger may vary a resultant performance and/or air cleaner efficiency of the air cleaner 200. For example, in some embodiments, providing a relatively higher voltage to the field charger may increase a performance and/or air cleaner efficiency of the air cleaner 200 as compared to a performance and/or air cleaner efficiency of the air cleaner 200 when a relatively lower voltage is provided to the field charger. In some embodiments, the air cleaner 200 may be configured to operate at one of three power level settings, high, medium, and low, each setting being indicative of relative voltage levels provided to the field charger.

In alternative embodiments, an air cleaner 200 may be configured to selectively modulate and/or vary a power level setting over one or more ranges of power levels. For example, the air cleaner 200 may even be capable of adjusting a voltage supplied to a field charger so that the air cleaner efficiency of the air cleaner 200 is adjustable over a relatively large range of values at which the air cleaner 200 may be effectively operated. Still further, in alternative embodiments of an air cleaner 200, the air cleaner 200 may comprise other components that affect air cleaner performance and/or an air cleaner efficiency of the air cleaner 200 in addition to or instead of a field charger. During subsequent discussion of a so-called air cleaner power setting and/or field charger power setting, it will be appreciated that it is intended that operating an air cleaner 200 at a relatively higher power setting is meant to control the air cleaner 200 and/or one or more of the components of the air cleaner 200 to have a first or higher rate of performance and/or air cleaner efficiency while operating the air cleaner 200 at a relatively lower power setting is meant to control the air cleaner 200 and/or one or more of the components of the air cleaner 200 to have a second or relatively lower rate of performance and/or air cleaner efficiency as compared to the first or higher rate of performance and/or air cleaner efficiency.

In some embodiments, the system controller 106 may be operated to allow a user to control the HVAC system 100 to meet a user's demand for air cleaned by the air cleaner 200. In some embodiments, the user's demand for the provision of cleaned air may comprise controlling one or more of (1) a volumetric flow-rate of air passing through the air cleaner 200, (2) a performance and/or air cleaner efficiency of the air cleaner 200, and (3) a duration of operation of the air cleaner 200 and/or indoor fan 110 that moves air through the air cleaner 200.

Figure 2A:
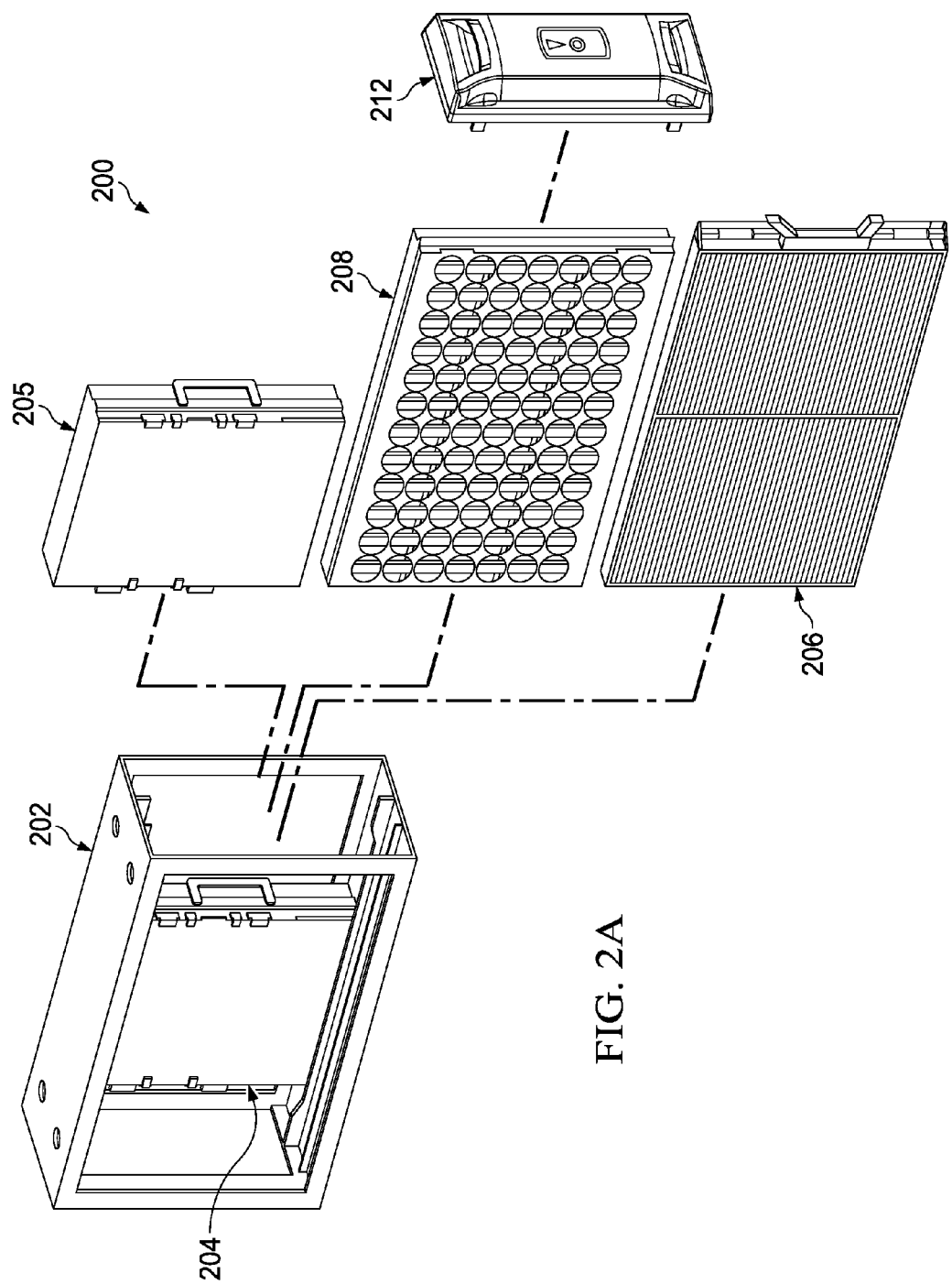
FIG. 2A is an exploded view of an air cleaner according to an embodiment of the disclosure.
Figure 2B:
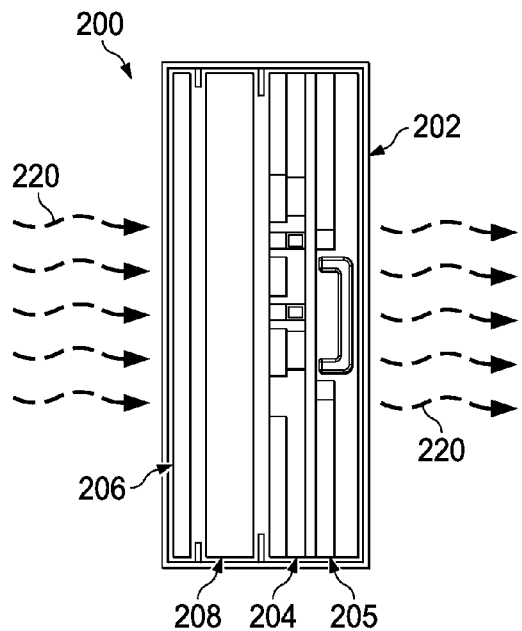
FIG. 2B is a cross-sectional view of an air cleaner according to an embodiment of the disclosure.

Referring now to FIG. 2A, an exploded view of the air cleaner 200 is shown. The air cleaner 200 may comprise a cabinet 202 that houses the other components of the air cleaner 200. The air cleaner 200 may also comprise a pre-filter 206 operable to trap large particles such as hair and lint. The air cleaner 200 may also comprise a field charger 208 (as described above) and collection cells 204 and 205 operable to remove and collect small impurities from the air. The field charger 208 may be operable to ionize the air close to the cells 204 and 205, thereby charging particles that pass through the pre-filter 206 in the air flow. Then, the particles are collected by the collection cells 204 and 205 which have an opposite charge of the particles in the air. Additionally, the air cleaner 200 may comprise a power door 212 operable to supply power to the air cleaner 200 and allow for control of the components of the air cleaner 200. FIG. 2B illustrates an orthogonal front view of the air cleaner 200 of FIG. 2A with door 212 removed, and the direction of the air flow 220 through the air cleaner 200. In some embodiments, the air cleaner 200 may comprise additional components and features not listed here, such as additionally power control components, for example. Additionally, although the air cleaner 200 is shown as a part of an HVAC system 100, embodiments may include stand-alone air cleaners comprising a field charger.

Figure 3A:
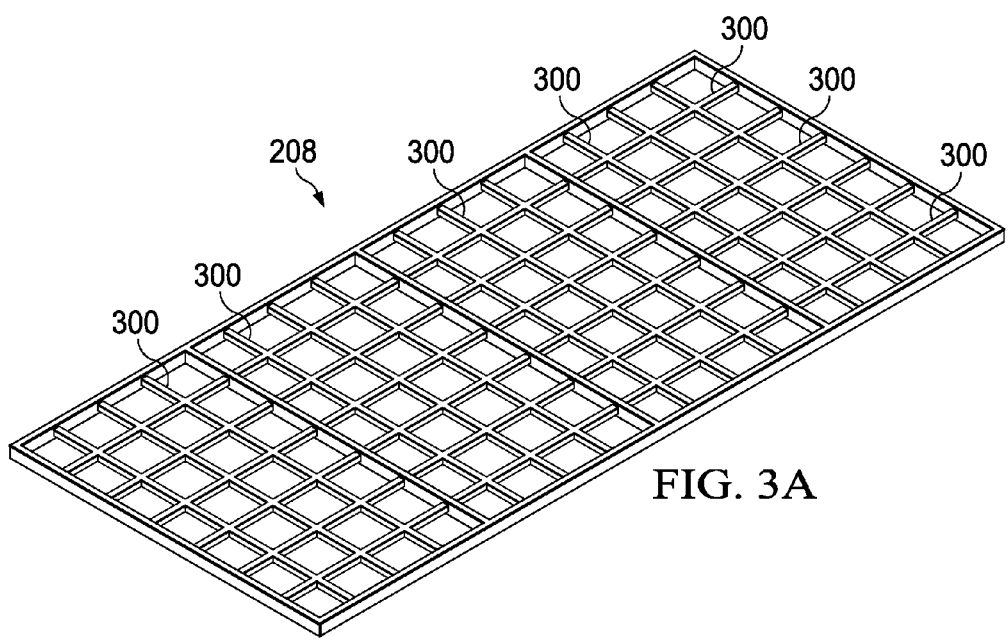
FIG. 3A is an oblique view of the field charger of FIGS. 2A-2B that comprises a plurality of interconnected bars according to an embodiment of the disclosure.
Figure 3B:
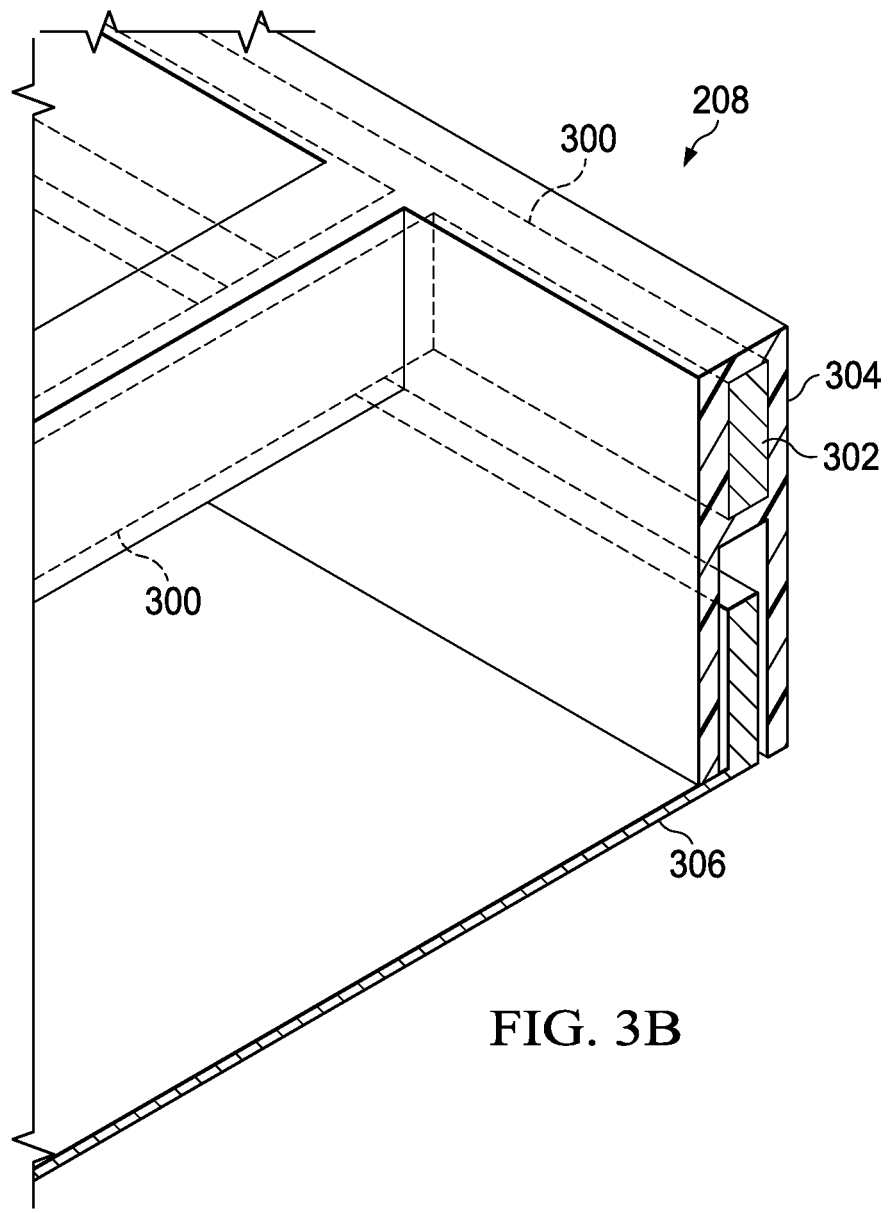
FIG. 3B is a partial cross-sectional view showing an inner core and an outer core of the plurality of interconnected bars of the field charger of FIG. 3A.

Referring now to FIGS. 3A-3B, an oblique schematic view of the field charger 208 is shown. In some embodiments, the field charger 208 may comprise a grid of interconnected bars 300. In some embodiments, the grid shape may be formed by molding bars 300 individually and then connecting the bars. In other embodiments, the bars 300 of the grid shape may be molded together, forming at least a portion of the total grid. In some embodiments, subsections of the grid may be formed and then connected. In some embodiments, the bars 300 forming the grid may comprise an inner core 302 and an outer overmold 304. In some embodiments, the inner core 302 may be made of a conductive plastic material and the outer overmold 304 may be made of a non-conductive insulating plastic material. In some embodiments, the grid shape of the field charger 208 may be coupled to an earth plate 306 to create a ground connection. The earth plate 306 may also provide stability for the grid of the field charger 208.

Figure 4A:
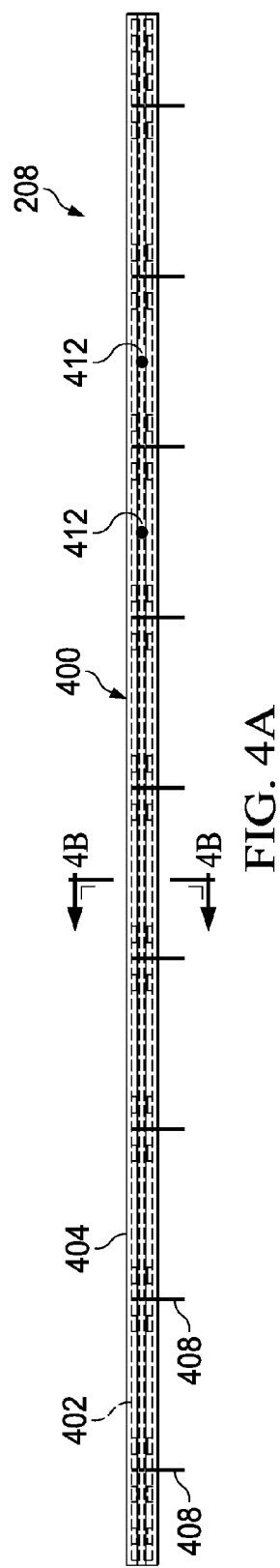
FIG. 4A is an orthogonal side view of a bar of a field charger according to an embodiment of the disclosure.
Figure 4C:
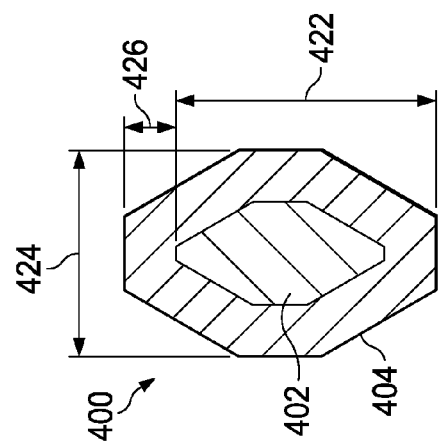
FIG. 4C is an orthogonal end view of the bar of FIGS. 4A-4B without the pin of FIG. 4B according to an embodiment of the disclosure.
Figure 4B:
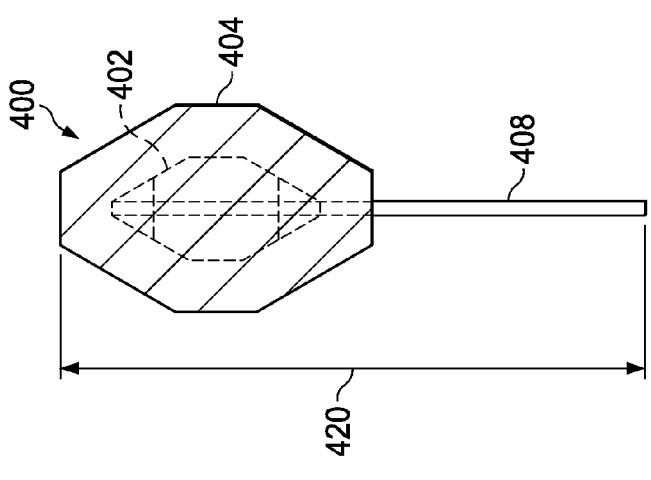
FIG. 4B is an orthogonal end view of the bar of FIG. 4A having a pin according to an embodiment of the disclosure.

Referring now to FIGS. 4A-4C, an alternative embodiment of a bar 400 is shown. Bar 400 is substantially similar to bar 300 at least insofar as it may be incorporate into the field charger 208. FIG. 4A illustrates a side view. The bar 400 may comprise an inner conductive core 402, a plurality of pins 408, and an outer non-conductive overmold 404. The pins 408 may be operable to ionize the air around the pins 408 when a voltage is distributed to the pins 408. In some embodiments, the pins 408 may be molded into the inner conductive core 402, wherein the conductive core 402 may supply the voltage to each of the pins 408. Then, the non-conductive overmold 404 may be molded over the inner core 402 and the pins 408, such that the pins 408 are conductively connected via the conductive core 402. In some embodiments, one or more contact points 412 may be molded into the conductive core 402 and overmold 404 to allow for a voltage to be applied to the inner core 402 and therefore the pins 408. In some embodiments, the inner conductive core 402 may comprise one or more of carbon powder or carbon fiber filled nylon having a minimum thickness of about 0.06 inches and a minimum filler percentage of 8% carbon powder or 5% carbon fiber. Alternatively, the core 402 may comprise stainless steel filled nylon comprising a minimum thickness of about 0.06 inches and a minimum filler percentage of about 10% stainless steel filler. In some embodiments, the overmold 404 material may be configured to electrically insulate against transmission of electricity of approximately 8000 to 9000 volts. In some embodiments, the non-conductive overmold 404 may comprise glass filled acetyl or polypropylene comprising a minimum thickness of about 0.06 inches and comprising a minimum glass filler percentage of about 10%. In some embodiments, the required properties of the conductive core 402 and the non-conductive overmold 404 may depend on their shape.

FIG. 4B illustrates an orthogonal end view of the bar 400. In some embodiments, the bar 400 may comprise an octagonal or tapered shape, as illustrated in FIG. 4B, while in other embodiments, the bars may comprise other shapes, such as rectangular, round, oval, T-shaped, etc. In some embodiments, the tapered edges of the bar 400 illustrated in FIG. 4B may reduce air-flow disruption over the bar 400. In some embodiments, the inner core 402 may be concentric with the outer overmold 404, wherein the shape formed by the edges of the core 402 may be similar to the shape formed by the edges of the overmold 404. In other embodiments, the shape of the core 402 may be different from the shape of the overmold 404. In some embodiments, the pin 408 may extend through the overmold 404 into the conductive core 402. In some embodiments, the pin 408 may be embedded (or extend) all the way through the inner core 402, as shown in FIG. 4B, which may provide stability for the pin(s) 408 held in place by the core 402 and overmold 404. In other embodiments, the pin 408 may extend though only a portion of the inner core 402, such as one-quarter of the way, half-way, or three-quarters of the way into the core 402, for example. The conductive connection between the conductive core 402 and the pins 408 may not depend on the depth that the pin 408 penetrates into the core 402.

In the specific embodiment shown in FIGS. 4A-4C, a height 420 of the bar 400 including the pin 408 may be approximately 0.713 inches. As shown in FIG. 4C, a height 422 of the bar 400, not including the pin 408, may be approximately 0.375 inches. A width 424 of the bar 400 may be approximately 0.250 inches. A thickness 426 of the outer overmold 404 (between the core 402 and the edges of the overmold) may be approximately 0.063 inches.

Referring now to FIGS. 5A-5D, orthogonal views of the inner core 402 of the bar 400 are shown. The inner core 402 may be injection molded around a plurality of pins 408, which may be spread along the length of the core 402. In the specific embodiment shown in FIG. 5A, the total length 520 of the core 402 may be approximately 19.250 inches. In some embodiments, the first pin 408 along the length of the core 402 may be at a distance 521 of approximately 1.121 inches from the end 403 of the core 402. A distance 522 between each of the pins 408 may be approximately 2.126 inches. The core 402 may comprise a plurality of cut-outs 502. The cut-outs 502 may be located on either side of the pins 408 and at the ends of the bar 400. In some embodiments, a first set of cut-outs 504 may be at a distance 525 of approximately 0.200 inches from the end 403 of the core 402. Depths 523 and 524 of all of the cut-outs 502 may be approximately 0.050 inches. A width 526 of the cut-outs 502 may be approximately 0.200 inches. Additionally, distances 527 and 528 between the pin 408 and the cut-outs 502 may be approximately 0.200 inches.

Figure 5A:
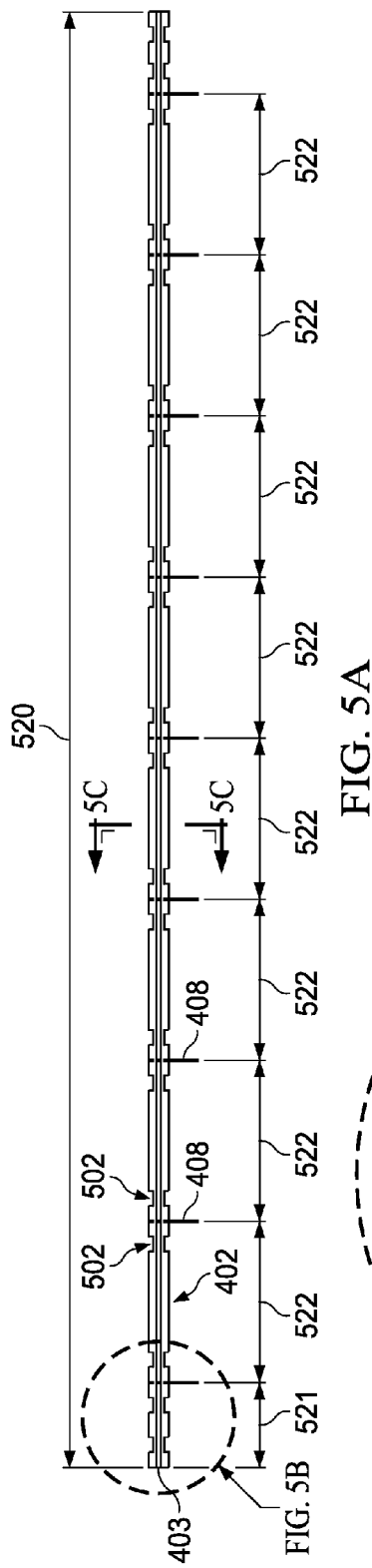
FIG. 5A is an orthogonal side view of an inner core of a bar of a field charger according to an embodiment of the disclosure.
Figure 5B:
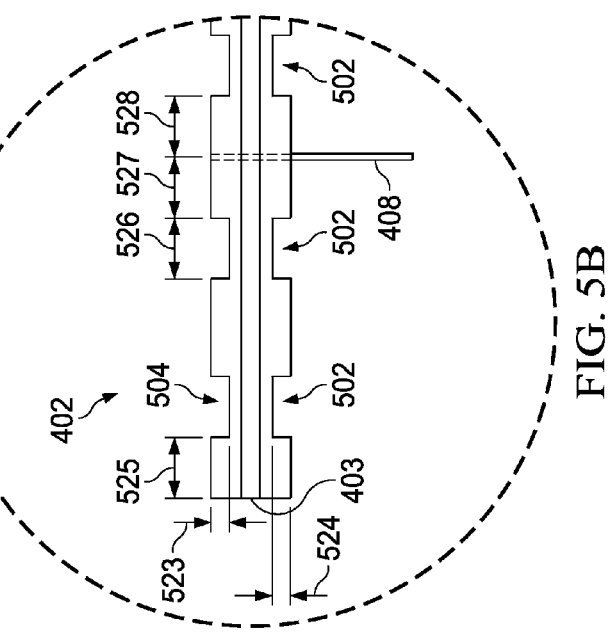
FIG. 5B is a detailed orthogonal view of a portion of the inner core of FIG. 5A according to an embodiment of the disclosure.
Figure 5C:
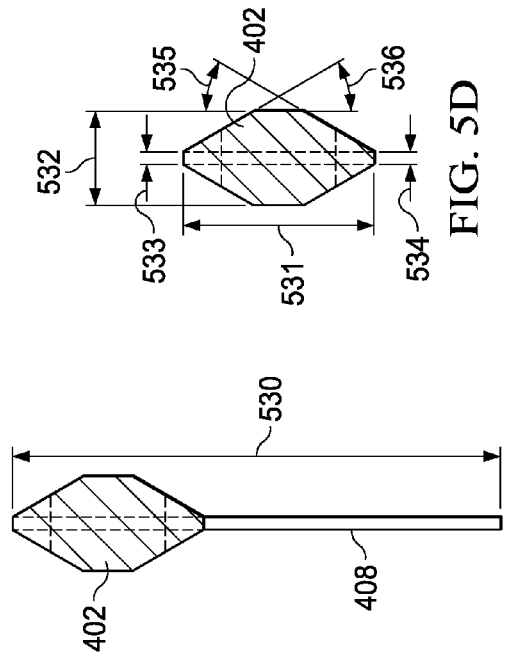
FIG. 5C is an orthogonal end view of the inner core of FIGS. 5A-5B having a pin according to an embodiment of the disclosure.
Figure 5D:
FIG. 5D is an orthogonal end view of the inner core of FIGS. 5A-5C without the pin of FIG. 5C according to an embodiment of the disclosure.

In the specific embodiment shown in FIGS. 5C and 5D, a height 530 of the inner core 402 and the pin 408 may be approximately 0.650 inches. Additionally, a height 531 of the inner core 402 (not including the pin 408) may be approximately 0.250 inches. In the embodiment shown, a total width 532 of the inner core 402 may be approximately 0.125 inches. The shape may comprise tapered edges, wherein widths 533 and 534 at the top and bottom of the inner core 402, respectively, may be approximately 0.016 inches. In the embodiments shown, angles 535 and 536 of the tapered edges relative to a side may be approximately 30 degrees, wherein the cross-section of the core 402 may be approximately symmetrical about vertical and horizontal axes.

Referring now to FIGS. 6A-6B, orthogonal views of the insulating overmold 404 are shown. In the specific embodiment, a total length 602 of the bar 400 may be approximately 19.375 inches. A distance 604 between the edge 601 of the overmold 404 and an edge 603 of the inner core 402 may be approximately 0.063 inches. A height 606 of the overmold 404 may be approximately 0.375 inches. A total width 608 of the overmold 404 may be approximately 0.250 inches. A thickness 610 of the overmold 404 may be approximately 0.063 inches. The overmold 404 may also comprise tapered edges similar to those of the inner core 402.

Referring now to FIGS. 7A-7B, orthogonal views of the pin 408 are shown. A length 702 of the pin 408 may be approximately 0.650 inches. A diameter 704 of the pin 408 may be approximately 0.016 inches.

Figure 8:
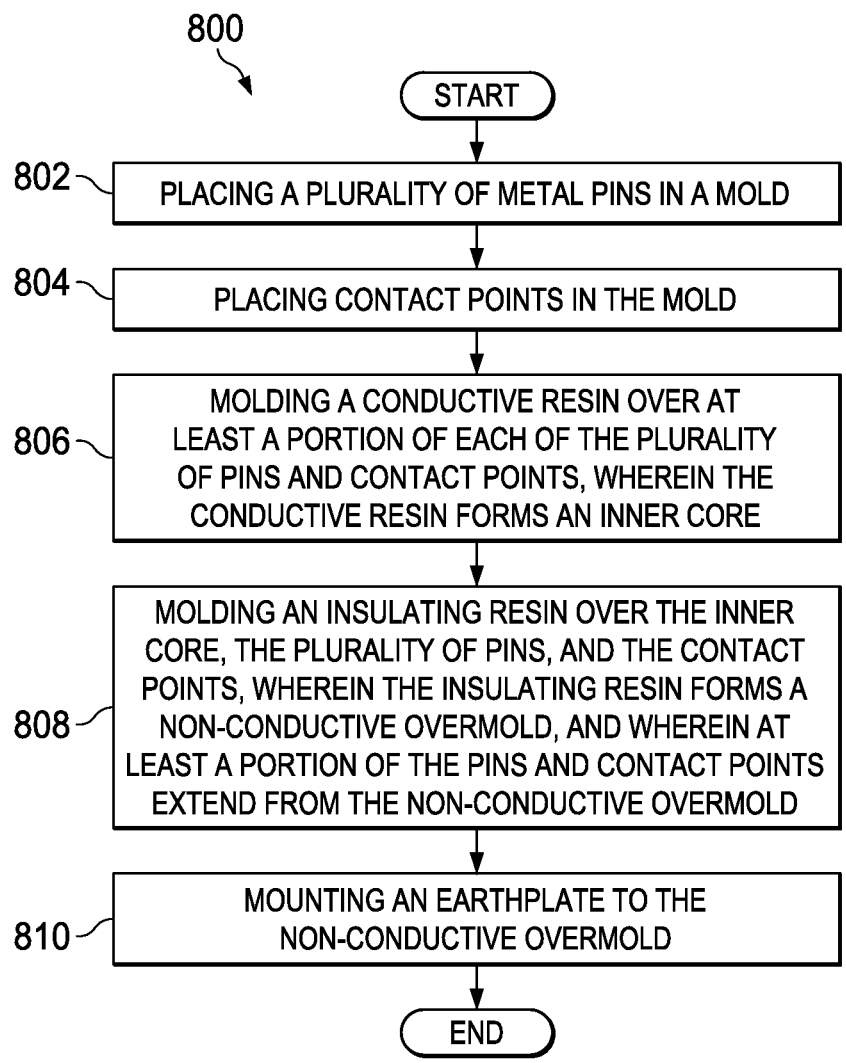
FIG. 8 is a flowchart of a method 800 of manufacturing a field charger according to an embodiment of the disclosure.

Referring now to FIG. 8, a flow chart of a method 800 of manufacturing a field charger is shown. The method 800 starts at block 802, where a plurality of metal pins is placed in a mold. Then, at block 804, contact points are also placed in the mold. At block 806, a conductive resin is molded over at least a portion of each of the plurality of pins, wherein the conductive resin forms an inner core. At block 808, an insulating resin is molded over the inner core, plurality of pins, and contact points, wherein the insulating resin forms a non-conductive overmold, and wherein at least a portion of the pins and contact points extend from the non-conductive overmold. At block 810, an earthplate is mounted to the non-conductive overmold. In some embodiments, the shape of the mold comprises at least one bar. In some embodiments, the shape of the mold comprises a grid with horizontal and vertical bars.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An air cleaning system, comprising:
    a field charger, the field charger comprising:
        a plurality of bars each comprising an octagonal profile and conductively connected to form a conductive inner core, wherein the conductive inner core comprises a non-conductive overmold molded over the conductive inner core; and
        a plurality of pins embedded at least partially within and conductively connected to the conductive inner core and extending at least partially out of the non-conductive overmold;
    at least one collection cell; and
    a cabinet operable to house the field charger and the at least one collection cell.

2. The system of claim 1, wherein the conductive inner core comprises a conductive plastic resin molded over the plurality of pins.

3. The system of claim 1, wherein the non-conductive overmold comprises a nonconductive plastic resin.

4. The system of claim 1, wherein the plurality of bars form a rectangular grid.

5. The system of claim 4, wherein the rectangular grid is molded as one piece.

6. The system of claim 4, wherein the bars are molded individually and then conductively connected to form the rectangular grid.

7. The system of claim 4, wherein the rectangular grid is molded into subsections which are then conductively connected.

8. The system of claim 1, wherein the field charger further comprises an earthplate coupled to the plurality of bars and configured to provide a ground connection for the field charger.

9. The system of claim 1, wherein the non-conductive overmold comprises an octagonal profile concentric with the octagonal profile of the conductive inner core to reduce disruption of airflow over the field charger.

* * * * *